(12) United States Patent
Nakajima et al.

(10) Patent No.: US 8,880,912 B2
(45) Date of Patent: Nov. 4, 2014

(54) POWER SUPPLY DEVICE AND IMAGE FORMING APPARATUS

(75) Inventors: Mikio Nakajima, Kanagawa (JP); Tetsuya Yano, Kanagawa (JP); Tomohide Kondo, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 420 days.

(21) Appl. No.: 13/227,731

(22) Filed: Sep. 8, 2011

(65) Prior Publication Data

US 2012/0066522 A1 Mar. 15, 2012

(30) Foreign Application Priority Data

Sep. 9, 2010 (JP) ................................. 2010-201566

(51) Int. Cl.
- G06F 1/26 (2006.01)
- G06F 5/00 (2006.01)
- H02J 9/06 (2006.01)

(52) U.S. Cl.
CPC ....................................... *H02J 9/06* (2013.01)
USPC .......................................... 713/300; 323/299

(58) Field of Classification Search
None
See application file for complete search history.

(56) References Cited

U.S. PATENT DOCUMENTS

| | | | | |
|---|---|---|---|---|
| 7,622,898 B2 * | 11/2009 | Shimizu et al. | ............... | 320/166 |
| 8,422,905 B2 * | 4/2013 | Yashiro | ............................ | 399/88 |
| 2007/0200432 A1 * | 8/2007 | Yano et al. | ....................... | 307/44 |
| 2007/0201894 A1 * | 8/2007 | Kishi et al. | ....................... | 399/88 |
| 2007/0280720 A1 * | 12/2007 | Kimura | ........................... | 399/88 |
| 2011/0131434 A1 * | 6/2011 | Nakaya | .......................... | 713/320 |

FOREIGN PATENT DOCUMENTS

| | | |
|---|---|---|
| JP | 2006-149125 | 6/2006 |
| JP | 2010-191870 | 9/2010 |
| JP | 4577781 | 9/2010 |

OTHER PUBLICATIONS

Office Action issued Jul. 1, 2014 in Japanese Patent Application No. 2010-201566.

* cited by examiner

*Primary Examiner* — Ji H Bae

(74) *Attorney, Agent, or Firm* — Oblon, Spivak, McClelland, Maier & Neustadt, L.L.P.

(57) ABSTRACT

A power supply device provided with a main power supply unit that supplies generated predetermined power to an electric load, a current detecting unit, a current indicating unit, an electric storage unit, an auxiliary power supply unit, and a control unit that determines an upper limit current value to be output to the current indicating unit on the basis of at least a condition of the electric load, and controls the upper limit current value such that power supplied from the auxiliary power supply unit to the electric load is converged in a predetermined convergence time when the power supply from the auxiliary power supply unit to the electric load is stopped or reduced.

6 Claims, 10 Drawing Sheets

POWER SUPPLY DEVICE AND IMAGE FORMING APPARATUS

CROSS-REFERENCE TO RELATED APPLICATIONS

The present application claims priority to and incorporates by reference the entire contents of Japanese Patent Application No. 2010-201566 filed in Japan on Sep. 9, 2010.

BACKGROUND OF THE INVENTION

1. Field of the Invention

The present invention relates to a power supply device and an image forming apparatus, and more specifically, to a power supply device and an image forming apparatus using an auxiliary power supply unit in addition to a main power supply unit.

2. Description of the Related Art

An image forming apparatus utilizing an electrophotography process, typified by an MFP performing copying, printing, scanning, facsimile and other functions in combination, tends to increase in maximum power consumption as a result of increasing number of functions and increasing complexity. The image forming apparatus utilizing an electrophotography process also tends to increase power to be supplied to a fixing heater in order to reduce the waiting time for waiting a fixing section becomes ready from startup, or the waiting time of an operator or the apparatus itself during which the function or operation of the image forming apparatus temporarily stops because of the lowered temperature of the fixing section in the course of the image forming process. As a result, not only the amount of general power consumption required in a general operation but also the amount of maximum required power consumption is increased in the image forming apparatus.

A commercial AC power supply has an upper limit of the amount of available power in spite of the increasing amount of power consumption. Accordingly, in the image forming apparatus, the amount of maximum required power consumption cannot be covered only with the amount of power supplied to a main power supply unit from the commercial power supply. To cope with this problem, in a technique conventionally employed, an electric storage device is provided as an auxiliary power supply unit, and the auxiliary power supply unit supplies power if the amount of power supplied from a main power supply is not enough.

In the conventional power supplying technique employing an auxiliary power supply unit, the auxiliary power supply unit uses a constant-voltage power supply circuit as a power output circuit, namely as a feeder circuit to an electric load (herein also merely referred to as "load") just like the main power supply unit uses a constant-voltage power supply circuit as a power output circuit. If the constant-voltage power supply circuits are used, a switching circuit makes switching between the output of the power output circuit of the main power supply unit that is a constant-voltage power supply circuit, and the output of the power output circuit of the auxiliary power supply unit that is also a constant-voltage power supply circuit, and supplies the selected output to the electric load. In this case, difference in output voltage between the two constant-voltage power supply circuits generates voltage fluctuations during the switching.

This problem may be solved by the following conventional technique. In this technique, a constant-current power supply circuit is used as a feeder circuit of the auxiliary power supply unit. Further, the output of the constant-voltage power supply circuit of the main power supply unit and the output of the constant-current power supply circuit of the auxiliary power supply unit are connected in parallel to supply the power from the main power supply unit and the power from the auxiliary power supply unit simultaneously to the electric load. This eliminates switching between one power supply circuit and a different power supply circuit to feed power, thereby suppressing voltage fluctuations to be caused by the switching.

Thus, voltage fluctuations of some volts can be reduced to voltage fluctuations smaller than 1 V, so that voltage fluctuations at the electric load can be reduced.

If the constant-current power supply circuit is used as a feeder circuit of the auxiliary power supply unit, power supply from the auxiliary power supply unit is stopped and only the main power supply unit becomes responsible for power supply to the electric load when power stored in the auxiliary power supply unit becomes empty, or when power supply from the auxiliary power supply unit to the electric load becomes unnecessary, for example. As for a method of stopping power supply from the auxiliary power supply unit, there are conventionally known a method of switching according to the fixing temperature, or a method of switching according to the predetermined time. However, these are all about timing of switching, and it has not been found clearly how to stop power being supplied from the auxiliary power supply unit.

When power supply from the auxiliary power supply unit is stopped like the above method, switching performed with large output current flowing from the auxiliary power supply unit makes sudden change in power supplied from the main power supply unit by the magnitude of the output current of the auxiliary power supply unit, resulting in generation of voltage fluctuations at the electric load.

Generation of the voltage fluctuations at the electric load causes unstable operation of a motor as an electric load, temporary halt of the motor, for example, leading to nonuniform rotation of the motor. The nonuniform rotation of the motor makes a formed image be an abnormal image. As an example, the formed image suffers from color deviation if it is formed in a color image forming apparatus.

In one conventional technique, the output of a constant-voltage controlled first power supply (main power supply) and the output of a constant-current controlled second power supply (auxiliary power supply) are connected in parallel. Power from the first power supply and power from the second power supply are simultaneously supplied to an electric load, thereby suppressing voltage fluctuations that would be otherwise caused by switching of power feed, for example, with a switch to be made between the one to the other (see Japanese Patent Application Laid-open No. 2007-236159).

The conventional technique disclosed in Japanese Patent Application Laid-open No. 2007-236159 suppresses fluctuations of voltage to be applied to the electric load due to switching between the power supplies by simultaneously supplying power from the main power supply and the power from the auxiliary power supply to the load. Meanwhile, switching may be performed with large output current flowing from the auxiliary power supply unit in order to stop the output of the auxiliary power supply unit. This still generates the problem of generation of voltage fluctuations at the electric load by sudden increase of power to be supplied from the main power supply unit by the magnitude of the output current from the auxiliary power supply unit. Thus, a technique to resolve this problem has desired.

SUMMARY OF THE INVENTION

It is an object of the present invention to at least partially solve the problems in the conventional technology.

According to an aspect of the present invention, there is provided a power supply device includes: a main power supply unit that generates predetermined power from power supplied from an external source, and supplies the generated predetermined power to an electric load; a current detecting unit that detects a load current value of a load current that flows to the electric load; a current indicating unit that compares the load current value with a predetermined upper limit current value, and outputs a current value indication signal that indicates a difference current value that corresponds to a surplus of the load current value relative to the upper limit current value; an electric storage unit that stores the power supplied from the external source; an auxiliary power supply unit that generates constant-current power from the power stored in the electric storage unit, and supplies the generated constant-current power to the electric load, the constant-current power adopting the difference current value indicated by the current value indication signal as a set current value; and a control unit that determines the upper limit current value to be output to the current indicating unit on the basis of at least a condition of the electric load, and controls the upper limit current value such that power supplied from the auxiliary power supply unit to the electric load is converged in a predetermined convergence time when the power supply from the auxiliary power supply unit to the electric load is stopped or reduced.

According to an aspect of the present invention, there is provided an image forming apparatus that forms an image by operating an image forming unit as an electric load with power supply. The apparatus is provide with a power supply device that includes: a main power supply unit that generates predetermined power from power supplied from an external source, and supplies the generated predetermined power to an electric load; a current detecting unit that detects a load current value of a load current that flows to the electric load; a current indicating unit that compares the load current value with a predetermined upper limit current value, and outputs a current value indication signal that indicates a difference current value that corresponds to a surplus of the load current value relative to the upper limit current value; an electric storage unit that stores the power supplied from the external source; an auxiliary power supply unit that generates constant-current power from the power stored in the electric storage unit, and supplies the generated constant-current power to the electric load, the constant-current power adopting the difference current value indicated by the current value indication signal as a set current value; and a control unit that determines the upper limit current value to be output to the current indicating unit on the basis of at least a condition of the electric load, and controls the upper limit current value such that power supplied from the auxiliary power supply unit to the electric load is converged in a predetermined convergence time when the power supply from the auxiliary power supply unit to the electric load is stopped or reduced.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A preferred embodiment of the present invention will be described in detail with reference to the accompanying drawings. The embodiment described below is a preferred embodiment of the invention, and accordingly it contains various technically preferred limitations. However, the following description is not intended to unreasonably limit the scope of the invention. Further, all structures described in the embodiment are not indispensable constituent elements of the invention.

First Embodiment

Figure 1:
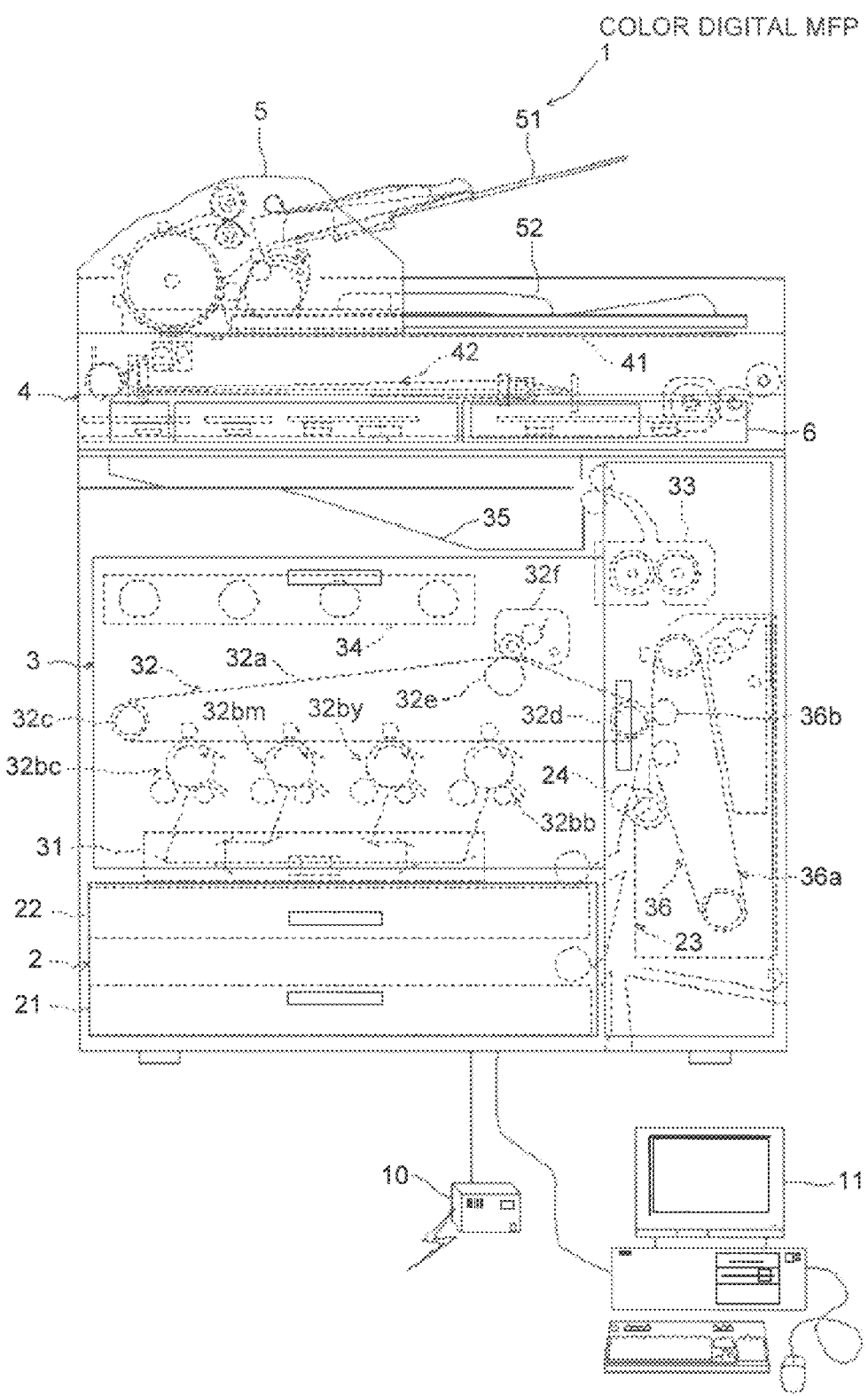
FIG. 1 is a diagram schematically showing the structure of a color digital MFP to which an embodiment of the present invention is applied.

FIGS. 1 to 10B are diagrams showing the embodiment of a power supply device and an image forming apparatus of the present invention. FIG. 1 is a front view schematically showing the structure of a color digital MFP 1 to which the embodiment of the power supply device and the image forming apparatus of the invention is applied.

As shown in FIG. 1, the color digital MFP 1 includes a paper feeding unit 2, a printer unit 3, a scanner unit 4, and an ADF (automatic document feeder) 5 that are stacked in this order from below. The color digital MFP 1 also includes an operation display unit 6, a control unit 7 (see FIG. 2), and others. A PBX (private branch exchange) 10 and an external device 11 such as a personal computer that uses the color digital MFP 1 are connected to the color digital MFP 1. In response to an operation through the operation display unit 6, for example, the color digital MFP 1 uses the aforementioned units 2 to 5 to perform various functions including image reading, printing, copying, and facsimile communication functions. The color digital MFP 1 communicates with an external facsimile device through the PBX 10. The color digital MFP 1 also communicates with the external device 11 to transmit and receive image data to and from the external device 11.

The paper feeding unit 2 includes a plurality of (in FIG. 1, two) paper feed trays 21 and 22, a conveying section 23, and others. The paper feed trays 21 and 22 each house recording sheets (sheets) of various sizes placed in any paper feeding directions. The paper feed trays 21 and 22 each house recording sheets the both sides of each of which are left blank (unused recording sheets), and recording sheets one side of each of which is recorded (one-sided used recording sheets) according to a user's intention.

The conveying section 23 includes a registration roller 24. The conveying section 23 selectively feeds a recording sheet housed in the paper feed tray 21 or 22 to the registration roller 24. The registration roller 24 carries the recording sheet to the printer unit 3 after performing timing adjustment.

Figure 2:
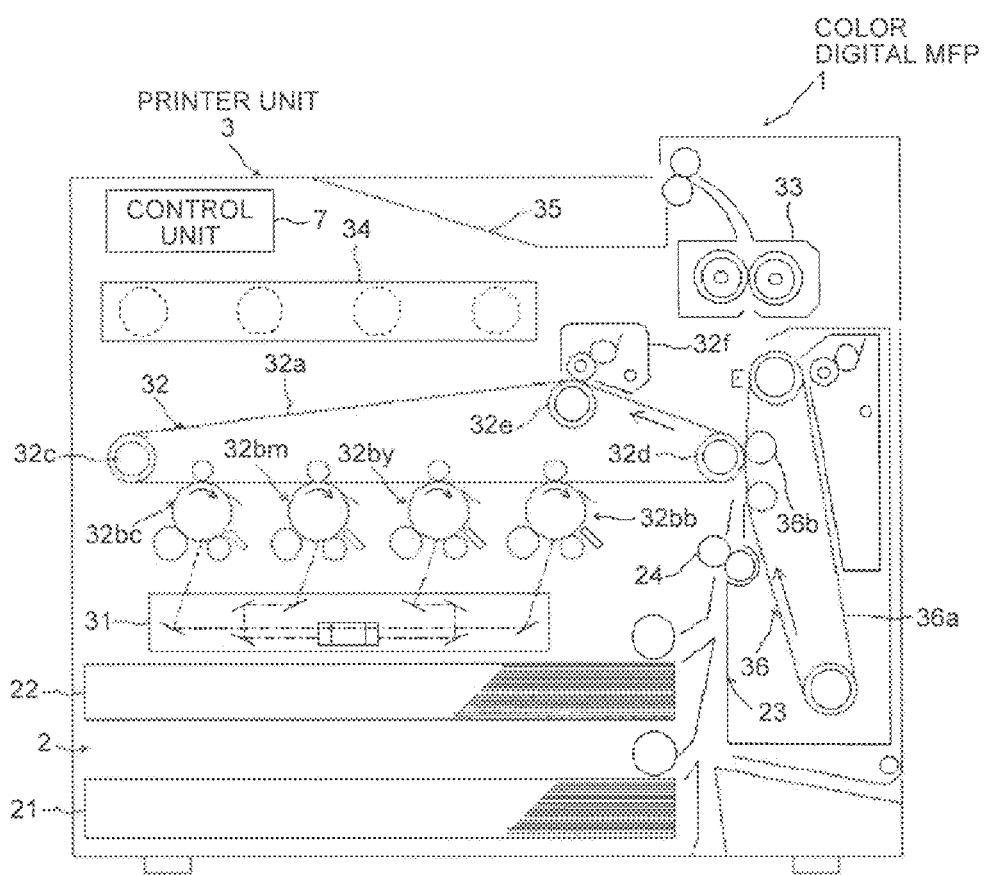
FIG. 2 is a diagram showing the structure of a printer unit in detail.

The printer unit 3 is a four-drum (tandem type) full-color printer unit. As shown in FIG. 2, the printer unit 3 includes a laser exposing section 31, an image forming section 32, a fixing section 33, a storing section 34, and others. The printer unit 3 causes the image forming section 32 to form an image on the upper side of a recording sheet fed from the paper feed tray 21 or 22 of the paper feeding unit 2 through the conveying section 23. The printer unit 3 thereafter causes the fixing section 33 to fix the image, and to feed the recording sheet to a discharge tray 35 placed inside the body.

The image forming section 32 includes image forming units 32bc, 32bm, 32by and 32bb arranged in a line along a primary transfer belt 32a in the form of an endless belt. The image forming units 32bc, 32bm, 32by and 32bb correspond to C (cyan), M (magenta), Y (yellow) and B (black), respectively. The primary transfer belt 32a is wound around a pair of support rollers 32c and 32d and a tension roller 32e, and is caused to rotate in a clockwise direction as shown by an arrow of FIG. 1. The image forming units 32bc, 32bm, 32by and 32bb are disposed between the paired support rollers 32c and 32d. The tension roller 32e is provided with a transfer member cleaning unit 32f that removes remaining toner left on the primary transfer belt 32a. The image forming units 32bc, 32bm, 32by and 32bb each are composed of a photosensitive element rotating in a clockwise direction as shown by an arrow of FIG. 1, a roller charging device for uniformly charging the photosensitive element, a developing section for supplying toners, a transfer roller for transferring a toner image one above the other onto the primary transfer belt 32a, and others. The roller charging device, the developing section, the transfer roller, and the like are arranged around the photosensitive element. Note that the photosensitive elements, the roller charging devices, the developing sections, and the transfer rollers are not assigned numbers in the drawings. The photosensitive elements are uniformly charged with the roller charging devices, and lasers modulated with image data of corresponding colors given from the laser exposing section 31 are applied to the photosensitive elements in the corresponding colors to form electrostatic latent images. The image forming section 32 supplies the photosensitive elements on which the electrostatic latent images are formed with toners in the corresponding colors from the developing sections to form toner images in the corresponding colors on the respective photosensitive elements. Then, the image forming section 32 transfers the toner images one above the other onto the primary transfer belt 32a through the transfer rollers to form a color toner image. The image forming section 32 may form a single-color image in black by using only the image forming unit 32bb corresponding to black. The exposing section 31 does not necessarily use laser, but it may also be an exposing section with an LED array and an imaging unit, for example.

A secondary transfer belt 36a of a secondary transfer section 36 is disposed on the right side of the primary transfer belt 32a in FIG. 1. The secondary transfer section 36 includes a secondary transfer roller 36b disposed at a position facing the support roller 32d with the primary and secondary transfer belts 32a and 36a interposed therebetween. A recording sheet fed from the paper feeding unit 2 is subjected to timing adjustment by the registration roller 24, and is thereafter sent to be placed between the primary and secondary transfer belts 32a and 36a. The primary and secondary transfer belts 32a and 36a form a predetermined transfer nip. The secondary transfer belt 36a is supported under tension between a support roller and a driving roller (not assigned numbers) such that the secondary transfer belt 36a can rotate in a direction of an arrow. The secondary transfer roller 36b is placed on the rear side of the secondary transfer belt 36a (inside the loop). A cleaning unit, a charger (not assigned numbers), and others are provided on the outer side of the secondary transfer belt 36a. The cleaning unit wipes unnecessary remaining toner from the secondary transfer belt 36a after a toner image is transferred to a sheet.

The image forming section 32 applies a transferring voltage of the secondary transfer roller 36b to transfer the color toner image on the primary transfer belt 32a onto a recording sheet having been carried to a position between the primary and secondary transfer belts 32a and 36a. The secondary transfer belt 36a carries the recording sheet on which the toner image has been transferred to the fixing section 33.

The fixing section 33 applies heat and pressure to the recording sheet on which the toner image has been transferred to fix the toner image, and feeds the recording sheet on which the toner image has been fixed to the discharge tray 35.

If a sheet after being subjected to fixing at the fixing section 33 is discharged directly to the discharge tray 35, the sheet is placed on the discharge tray 35 while a side (page) of a double-sided images which is transferred later onto the sheet, namely a side transferred directly from the primary transfer belt 32a onto the sheet is placed as an underside as shown in FIG. 2. Accordingly, in order to collate pages in duplex printing, the image forming section 32 first forms an image of a second page, causes the secondary transfer belt 36a to hold the toner image thereof, and then transfers an image of a first page directly from the primary transfer belt 32a onto a sheet. The image forming section 32 conducts exposure such that the image to be transferred directly from the primary transfer belt 32a onto the sheet becomes a normal image on the surfaces of the photosensitive elements, while the toner image transferred from the secondary transfer belt 36a onto the sheet becomes a reverse image (mirror image) on the surfaces of the photosensitive elements. The color digital MFP 1 performs image processing to switch the order of image formation and to make switching between a normal image and a reverse image (mirror image) by reading and writing image data to and from a memory of the control unit 7.

To be specific, the color digital MFP 1 has a duplex printing mode and a single-sided printing mode. In the duplex printing mode, as described above, the color digital MFP 1 transfers an image of the rear side (second page) onto the secondary transfer belt 36a, and thereafter, transfers an image of the front side (first page) onto the primary transfer belt 32a. The toner images on the primary and secondary transfer belts 32a and 36a are transferred simultaneously onto a sheet fed from the registration roller 24. For single-sided printing, the color digital MFP 1 has two single-sided transfer modes including a single-sided transfer mode with the secondary transfer belt 36a, and a single-sided transfer mode with the primary transfer belt 32a. In the single-sided transfer mode using the secondary transfer belt 36a, the color digital MFP 1 transfers a three-color or four-color toner image, or a single-color toner image in black formed on the primary transfer belt 32a onto the secondary transfer belt 36a, and transfers the toner image from the secondary transfer belt 36a onto one side (rear side) of a sheet. In this case, the color digital MFP 1 does not transfer an image onto the other side (front side) of the sheet, and discharges the printed sheet to the discharge tray 35 while the printed side is placed as an upper side. In the single-sided transfer mode using the primary transfer belt 32a, the color digital MFP 1 does not transfer a three-color or four-color toner image, or a single-color toner image in black formed on the primary transfer belt 32a onto the secondary transfer belt 36*a*, but transfers this toner image directly onto one side (front side) of a sheet. The color digital MFP 1 does not transfers an image onto the other side (front side) of the sheet. In this case, the color digital MFP 1 places the printed sheet on the discharge tray 35 with the printed side facing down.

The storing section 34 in FIG. 2 contains replenishment toners in all colors. The toners in all colors in the storing section 34 are fed through a powder pump not shown to the developing sections of the image forming units 32*bc*, 32*bm*, 32*by* and 32*bb* in the corresponding colors. Image formation of the color digital MFP 1 of the embodiment is such that an image is formed on each of the photosensitive elements of the four image forming units 32*bc*, 32*bm*, 32*by* and 32*bb* arranged in so-called a tandem style while the primary and secondary transfer belts 32*a* and 36*a* are caused to move, so that time duration for image formation can be shortened.

Figure 3:
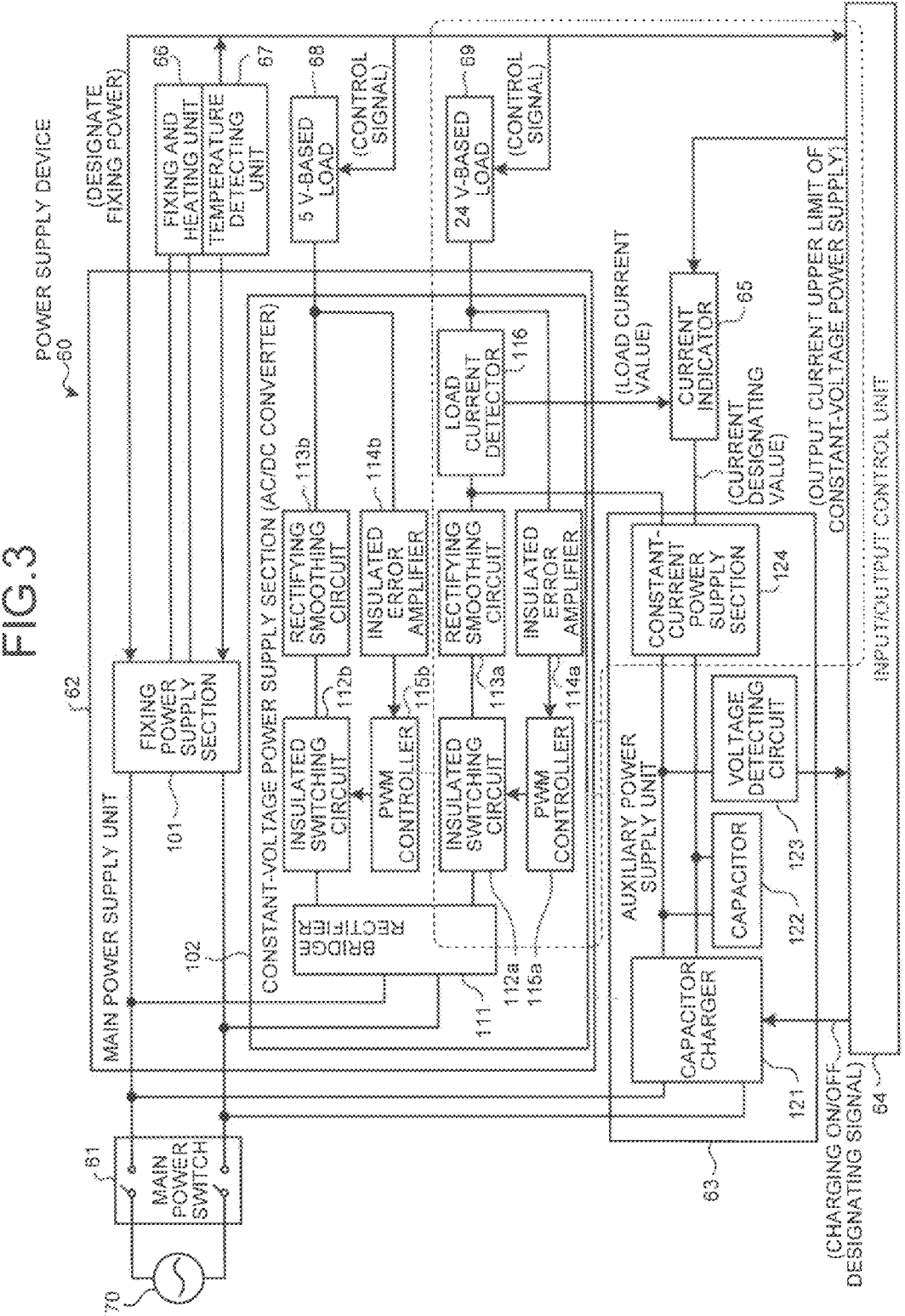
FIG. 3 is a block diagram showing the configuration of a power supply system of the color digital MFP.

As shown in FIG. 3, the color digital MFP 1 includes a power supply (power supply device) 60 of a block structure having a main power switch (SW) 61, a main power supply unit 62, an auxiliary power supply unit 63, an input/output control unit 64, a current indicator 65, a fixing and heating unit 66, a temperature detecting unit 67, a 5 V-based load 68, a 24 V-based load 69, and others.

A commercial alternating-current power supply (commercial AC power supply) 70 of 100 V is supplied through a power cord to the main power switch 61. Turning on of the main power switch 61 supplies external power from the commercial AC power supply 70 to the main and auxiliary power supply units 62 and 63.

The main power supply unit 62 includes a fixing power supply section 101 and a constant-voltage power supply section 102. The constant-voltage power supply section 102 is an AC/DC converter, and includes a bridge rectifier 111; an insulated switching circuit 112*a*, a rectifying smoothing circuit 113*a*, an insulated error amplifier 114*a*, and a PWM (pulse width modulation) controller 115*a* for the 24 V-based load 69; an insulated switching circuit 112*b*, a rectifying smoothing circuit 113*b*, an insulated error amplifier 114*b*, and a PWM controller 115*b* for the 5 V-based load 68; and a load current detector 116 for detecting the load current of the 24 V-based load 69.

The fixing power supply section (power supply unit for fluctuating electric load) 101 is an AC control circuit. The fixing power supply section 101 performs feed-back control of power supplied to the fixing and heating unit 66 by using a detected temperature signal detected by the temperature detecting unit 67 so that the temperature of the fixing section 33 is controlled at a fixing temperature within a range of power indicated by a power indication signal given from the input/output control unit 64.

The constant-voltage power supply section 102 causes the bridge rectifier 111, and the insulated switching circuit 112*a* and the rectifying smoothing circuit 113*a* for the 24 V-based load 69 to convert the commercial AC power supply 70 to a DC (direct-current) constant voltage, and to supply the DC constant voltage to the 24 V-based load 69. Further, the constant-voltage power supply section 102 gives a direct-current voltage from the rectifying smoothing circuit 113*a* to the 24 V-based load 69 as an FB (feedback) signal to the PWM controller 115*a* through the insulated error amplifier 114*a*. Then, the PWM controller 115*a* controls switching of the insulated switching circuit 112*a* based on the FB signal.

Likewise, the constant-voltage power supply section 102 causes the bridge rectifier 111, and the insulated switching circuit 112*b* and the rectifying smoothing circuit 113*b* for the 5 V-based load 68 to convert the commercial AC power supply 70 to a DC (direct-current) constant voltage, and to supply the DC constant voltage to the 5 V-based load 68. Further, the constant-voltage power supply section 102 gives a direct-current voltage from the rectifying smoothing circuit 113*b* to the 5 V-based load 68 as an FB (feedback) signal to the PWM controller 115*b* through the insulated error amplifier 114*b*. Then, the PWM controller 115*b* controls switching of the insulated switching circuit 112*b* based on the FB signal.

The auxiliary power supply unit 63 includes a capacitor charger 121, a capacitor 122, a voltage detecting circuit 123, a constant-current power supply section 124, and others. The auxiliary power supply unit 63 supplies constant-current power to the 24 V-based load 69 on the basis of a current value indication signal from the current indicator (current indicating unit) 65 described later. The capacitor charger 121 and the capacitor 122 together function as an electric storage unit.

To be specific, the commercial AC power is supplied to the capacitor charger 121 of the auxiliary power supply unit 63 through the main power switch 61. The capacitor charger 121 charges the capacitor 122. The voltage detecting circuit 123 detects a voltage to the constant-current power supply section 124. The constant-current power supply section 124 generates constant-current auxiliary power of a current responsive to the current value indication signal from the current indicator 65 by using electric charges charged in the capacitor 122, and supplies the auxiliary power through the load current detector 116 to the 24 V-based load 69. The capacitor 122 of the auxiliary power supply unit 63 may be of any types so long as the capacitor 122 is a capacitor having a predetermined large capacity. The present embodiment uses a long-lasting electric double-layer capacitor capable of being charged and discharged in a short period of time. The electric double-layer capacitor as the capacitor 122 is characterized in that a voltage across terminals (capacitor voltage) is reduced as discharge of the capacitor 122 proceeds. Accordingly, the circuit configuration of the auxiliary power supply unit 63 of the present embodiment is such that the constant-current power supply section 124 is disposed downstream of the capacitor 122 to realize output of a required current value even when the capacitor voltage fluctuations occur. The load current detector 116 uses a resistor R1 (see FIG. 5) of some milliohms for current detection. If the resistor R1 as a current sensor of the load current detector 116 is provided posterior to a section for retrieving a voltage detecting signal (feedback signal), a varying degree of voltage drop at the resistor R1 for current detection due to increase and decrease of the current value of an electric load makes a voltage applied to the electric load fluctuate. It is assumed, for example, that a resistor of 10 mΩ is connected as the resistor R1 for current detection of the load current detector 116, and a load changes from 5 A to 15 A. In this case, a voltage applied to the load fluctuates by 0.1 V (10 mΩ×(15 A−5 A)). Further, if the current detecting resistor R1 of the load current detector 116 is added outside the main power supply unit 62, the voltage applied to the load is caused to fluctuate to a greater degree than the aforementioned degree due to an influence by a wiring resistance.

In order to prevent fluctuations of a DC voltage applied to an electric load caused by addition of a current detecting resistor, the color digital MFP 1 of the present embodiment causes the insulated error amplifier 114*a* and the PWM controller 115*a* to feed back a voltage after passing through the resistor R1 of the load current detector 116 to perform constant voltage control such that the fed back voltage satisfies a target value, namely to perform feedback control.

Increase in an amount of power supply to the fixing and heating unit 66 is subtracted from an amount of power supply from the constant-voltage power supply section 102 to the 24 V-based load 69, which consumes the commercial AC power supply 70. The subtracted amount is compensated in such a manner that the auxiliary power supply unit 63 supplies power to the 24 V-based load by the subtracted amount. Accordingly, in consideration of the increase in the amount of power supply to the fixing and heating unit 66 (for example, 300 W), the color digital MFP 1 of the present embodiment supplies power from the auxiliary power supply unit 63 to the 24 V-based load 69 of which power consumption (for example, 500 W) is greater than that of the 5 V-based load 68 (for example, 100 W). The auxiliary power supply unit 63 may supply power to the 5 V-based load 68, in a case that the increase in the amount of power supply to the fixing and heating unit 66 is small, or in a case that the 5 V-based load 68 consumes a large amount of power.

Figure 4:
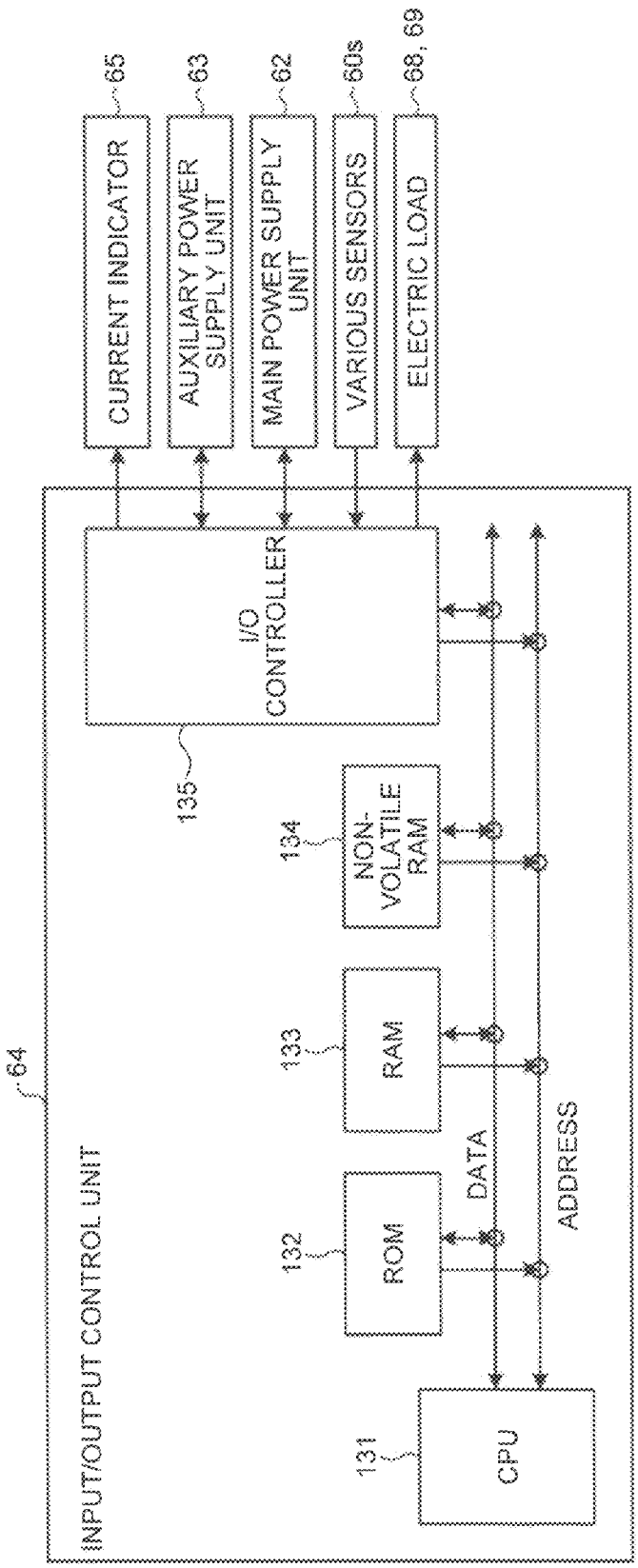
FIG. 4 is a block diagram showing the configuration of an input/output control unit.

The input/output control unit (control unit) 64 includes a CPU (central processing unit) 131, a ROM (read-only memory) 132, a RAM (random access memory) 133, a nonvolatile RAM 134, an I/O controller 135, and others as shown in FIG. 4. These units are connected to each other through a data bus and a control bus (address bus).

The current indicator 65, the auxiliary power supply unit 63, the main power supply unit 62, various sensors 60s, the electric loads 68 and 69, and others are connected to the I/O controller 135. The I/O controller 135 reads detecting signals detected by the sensors 60s of the color digital MFP 1, and controls drive of each of the 24 V-based load 69 and the 5 V-based load 68.

The ROM 132 stores various programs including an engine control program and a power control program relating to the present invention, and required data. The CPU 131 uses the RAM 133 as a working memory according to control instructions given by engine control, the programs stored in the ROM 132, and a program and data stored in the nonvolatile RAM 134 to control input to and output from each of the electric loads 68 and 69, and to control the power supply units 62 and 63. The nonvolatile RAM 134 stores the operating state of each of the electric loads 68 and 69, a power consumption table containing power consumption data in each operating mode, a printing process time table containing temporal data required for printing in each operating mode, and others.

The input/output control unit 64 controls input to and output from the sensors 60s, and the electric loads 68 and 69 while controlling power supply according to instructions given by control of processes under engine control such as image reading, printing and copying, and given by sequence control. Then, the input/output control unit 64 sequentially causes the electric loads 68 and 69 to operate according to each operating mode.

The input/output control unit 64 also controls charge and discharge of the capacitor 122. The input/output control unit 64 feeds the 24 V-based load 69 with power stored in the capacitor 122 in a period lasting from startup of the color digital MFP 1 until elapse of a certain time after the startup. At this time, the input/output control unit 64 uses excess power generated in response to the power supplied from the commercial AC power supply 70 to increase the amount of power to be supplied to the fixing and heating unit 66.

Figure 5:
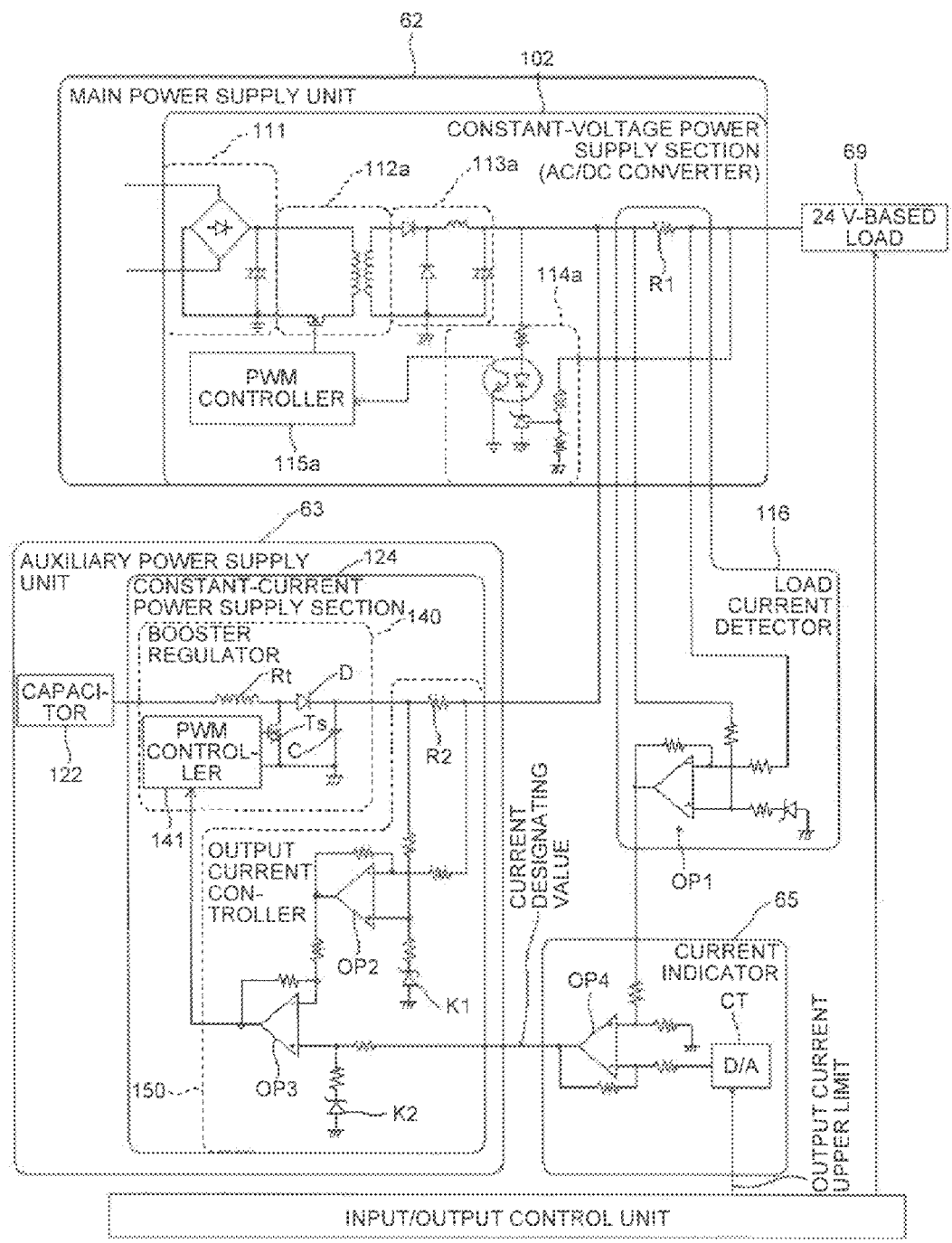
FIG. 5 is a diagram showing the circuit structures of principal parts of a main power supply unit and an auxiliary power supply unit.

The constant-voltage power supply section 102 of the main power supply unit 62 and the auxiliary power supply unit 63 have principal circuits of the structures shown in FIG. 5.

In FIG. 5, regarding the main power supply unit 62, the load current detecting resistor R1 of the load current detector 116 of the constant-voltage power supply section 102 connected to the 24 V-based load 69 is installed as part of the constant-voltage power supply section 102 of the main power supply unit 62 on the same substrate as the main power supply unit 62. A voltage across the load current detecting resistor R1 is used as an interface signal with a substrate on which the load current detector 116 is installed and which is different from the substrate holding the constant-voltage power supply section (main power supply unit 62), and a differential power amplifier OP1 of the load current detector 116, resistors (not assigned numbers) accompanying the differential amplifier OP1, and others are connected by a connector and a harness. This structure can prevent reduction in output accuracy of a power supply of the constant-voltage power supply section 102 to be caused by elongation (stretching) of the constant-voltage feedback loop of the constant-voltage power supply section 102. This eliminates the need for the constant-voltage power supply section 102 to be responsive to remote sensing, so that increase in the cost of the constant-voltage power supply section 102 can be suppressed while output accuracy of the power supply is maintained. Mechanism belonging to the auxiliary power supply unit 63, namely the auxiliary power supply unit 63, the current indicator 65, and the load current detector 116 may be combined optionally. In this case, the auxiliary power supply unit 63, the current indicator 65, the differential amplifier OP1, and the accompanying resistors of the load current detector 116 can be removed easily from the main power supply unit 62 without changing the main power supply unit 62 if the auxiliary power supply mechanisms are not to be installed. Thus, the cost of the main power supply unit 62 is increased only by the addition of the load current detecting resistor R1, thereby allowing formation of the main power supply unit 62 at low cost that is capable of being connected to the auxiliary power supply mechanisms such as the auxiliary power supply unit 63. The main power supply unit 62 may be given the load current detecting resistor R1 while the auxiliary power supply mechanisms are not provided. In this case, power consumption by the load current detecting resistor R1 occurs in the main power supply unit 62 to which the auxiliary power supply mechanisms are not connected. For example, the amount of power consumption is 2.25 W if a resistor of 10 mΩ is connected, and an operation load is 15 A. This amount of power consumption by the load current detecting resistor R1 is reduced to a smaller value during application of a lighter load, for example, in a standby state. Meanwhile, in order to eliminate power consumption by the load current detecting resistor R1, the load current detecting resistor R1 may not be provided and a jumper line may be connected instead. This slight change eliminates power consumption by the load current detecting resistor R1 without making the structure of the main power supply unit 62 complicated. This can also reduce the cost of the main power supply unit 62 further when the auxiliary power supply unit 63 is not installed.

As an alternative example, the load current detector 116 with the differential amplifier OP1 and the accompanying resistors may entirely be installed as part of the constant-voltage power supply section 102 of the main power supply unit 62 on the same substrate. In this case, the load current detector 116 may be connected via a connector, a harness, and others to the current indicator 65 provided on a substrate different from the constant-voltage power supply section 102 of the main power supply unit 62 while using a load current signal given from the differential amplifier OP1 as an interface signal between the substrates. Compared to the aforementioned structure, this structure can achieve substantially the same effects though the cost of the main power supply unit 62 is increased by the presence of the differential amplifier OP1 and the accompanying resistors. This structure can also increase noise tolerance by making transfer of an amplified signal, thereby enhancing the stability of the current detecting function.

In the constant-voltage power supply section 102 of the main power supply unit 62, the insulated error amplifier 114a includes voltage divider resistors R2 and R3, a shunt regulator SR, a photocoupler PC, and others. The insulated error amplifier 114a causes the voltage divider resistors R2 and R3 to divide a voltage at a stage subsequent to the load current detecting resistor R1 of the load current detector 116 (voltage of the DC 24 V-based load 69) to generate a voltage detecting signal, and to input the voltage detecting signal into the shunt regulator SR. The insulated error amplifier 114a causes the shunt regulator SR to compare the voltage detecting signal to a reference voltage, or amplify the voltage detecting signal. Then, the insulated error amplifier 114a causes the photocoupler PC to insulate the voltage detecting signal, and to output the voltage detecting signal as a feedback signal (FB) for constant-voltage control to the PWM controller 115a. The PWM controller 115a PWM-controls a primary current of the insulated switching circuit 112a to control a voltage immediately before being supplied to the 24 V-based load 69 and on a feeding line between the current detecting resistor R1 and the 24 V-based load 69, namely a voltage to be applied to a load at a constant voltage.

The constant-current power supply section 124 of the auxiliary power supply unit 63 includes a booster regulator 140 and an output current controller 150. The booster regulator 140 includes a PWM controller 141, a semiconductor switch Ts, a reactor Rt, a diode D, a capacitor C, and others. The output current controller 150 includes a current detecting resistor R2, differential amplifiers OP2 and OP3, biasing circuits K1 and K2, and others.

The auxiliary power supply unit 63 of the present embodiment uses an electric double-layer capacitor as the capacitor 122 as described above. An electric double-layer capacitor has a low withstand voltage, and the available upper limit of charge in use is 2.5 V. Accordingly, a large number of capacitors should be connected in series in order to obtain a high voltage. However, use of a small number of large-capacity capacitors requires lower cost than use of a large number of small-capacity capacitors connected in series in order to obtain the same capacity. Accordingly, the auxiliary power supply unit 63 of the present embodiment uses nine or less electric double-layer capacitors connected in series as the capacitor 122, and is provided with the booster regulator 140 in the constant-current power supply section 124 to compensate for a shortage to obtain 24 V. To be specific, if nine electric double-layer capacitors are used, the capacitors can be charged to an upper limit of 22.5 V. Accordingly, the booster regulator 140 boosts the voltage by 1.5 V, and then supplies 24 V at a constant current to the 24 V-based load 69.

The booster regulator 140 controls ON and OFF of the semiconductor switch Ts by means of an output PWM pulse of the PWM controller 141, and boosts power stored in the reactor Rt to charge the capacitor C under high voltage through the diode D. To be specific, when the semiconductor switch Ts is turned on (put to a conductive state), a current starts to flow from the capacitor 122 to the reactor Rt and the semiconductor switch Ts to store power in the reactor Rt. When the semiconductor switch Ts is turned off (put to a nonconductive state) in turn, the power stored in the reactor Rt becomes a high voltage to charge the capacitor C under high voltage through the diode D. The booster regulator 140 repeats the ON and OFF of the semiconductor switch Ts in a PWM pulse cycle to increase the voltage of the capacitor C, and supplies the 24 V-based load 69 with power through the current detecting resistor R2 and the current detecting resistor R1 of a load current detecting section 166.

The load current detector (current detecting unit) 116 causes the differential amplifier OP1 to amplify a potential difference across the current detecting resistor R1 to generate a load current signal (analog voltage) proportionate to the load current value of the 24 V-based load 69, and outputs the load current signal as a load current detected value to the current indicator 65.

The current indicator (current indicating unit) 65 includes a D/A converter CT, a differential amplifier OP4, and others. The current indicator 65 causes the D/A converter CT to perform analog conversion of an output current upper limit (upper limit current value) input from the input/output control unit 64 to obtain an upper limit indication signal (voltage). Then, the current indicator 65 causes the differential amplifier OP4 to make a calculation by subtracting the output current upper limit from the load current detected value, and to output a difference voltage representing a result of the calculation to the constant-current power supply section 124 as a current value indication signal (current indication value).

To be specific, the current indicator 65 sets a difference value, obtained by subtracting the output current upper limit of the constant-voltage power supply section 102 input from the input/output control unit 64 from the load current detected value input from the load current detector 116 regarding the 24 V-based load 69, as a target current value to be achieved by the constant-current power supply section 124 of the auxiliary power supply unit 63. Then, the current indicator 65 instructs the constant-current power supply section 124 to output a current at the target current value by giving the current indication value (target current value).

The constant-current power supply section 124 causes the differential amplifier OP2 to amplify a potential difference across the current detecting resistor R2 to generate an output current signal proportionate to an output current value, and to output the output current signal to the differential amplifier OP3. The differential amplifier OP3 amplifies a difference between the output current value indicated by the output current signal input from the differential amplifier OP2, and the target current value (current indication value) input from the current indicator 65. Then, the differential amplifier OP3 adds a voltage given from the biasing circuit K2 to the amplified difference, and outputs a result as a duty indication signal of a PWM pulse to the PWM controller 141.

The PWM controller 141 determines the duty of a PWM pulse based on a duty indicated by the duty indication signal input from the differential amplifier OP3, and controls ON and OFF of the semiconductor switch Ts with the determined PWM pulse duty. To be specific, the constant-current power supply section 124 raises the duty of a PWM pulse to increase the output current value of the booster regulator 140 if the output voltage of the differential amplifier OP3 rises as a result of increase of the target current value (current indication value) output by the current indicator 65. The constant-current power supply section 124 repeats the following control: Increase of the output current value of the booster regulator 140 makes the voltage drop greater at the current detecting resistor R2. This increases the output current value of the output current detecting signal detected by the current detecting resistor R2 and output from the differential amplifier OP2 to reduce the output voltage of the differential amplifier OP3. In response, the duty of a PWM pulse is decreased to reduce the output current value of the booster regulator 140.

The operation of the present embodiment will now be described. The color digital MFP 1 of the present embodiment stabilizes voltage fluctuations at the electric loads 68 and 69, when the power supply from the auxiliary power supply unit 63 is terminated, even in a case that the output current from the auxiliary power supply unit 63 is high. To be specific, the color digital MFP 1 supplies the power to the electric loads 68 and 69 from the constant-voltage output main power supply unit 62 using power supplied from the external commercial AC power supply 70 as an input source, as well as from the auxiliary power supply unit 63 using the capacitor 122. When the output of the auxiliary power supply unit 63 is stopped, and the power supply is switched only from the main power supply unit 62, the output current from the auxiliary power supply unit 63 is caused to converge to 0 A in a predetermined convergence time in order to suppress voltage fluctuations.

In the color digital MFP 1, when the CPU 131 of the input/output control unit 64 switches the main power switch 61 from OPEN to CLOSE (ON), or makes the color digital MFP 1 return from an energy-saving mode (power-saving mode) to a standby mode, the constant-voltage power supply section 102 of the main power supply unit 62 starts to output +5 V, so that +5 V (operating voltage) is added to the CPU 131. Then, the CPU 131 responds to a resetting pulse for turning a power supply on, thereby completing the initialization of the input/output control unit 64. The input/output control unit 64 thereafter starts the power feed control shown in FIG. 6.

Figure 6:
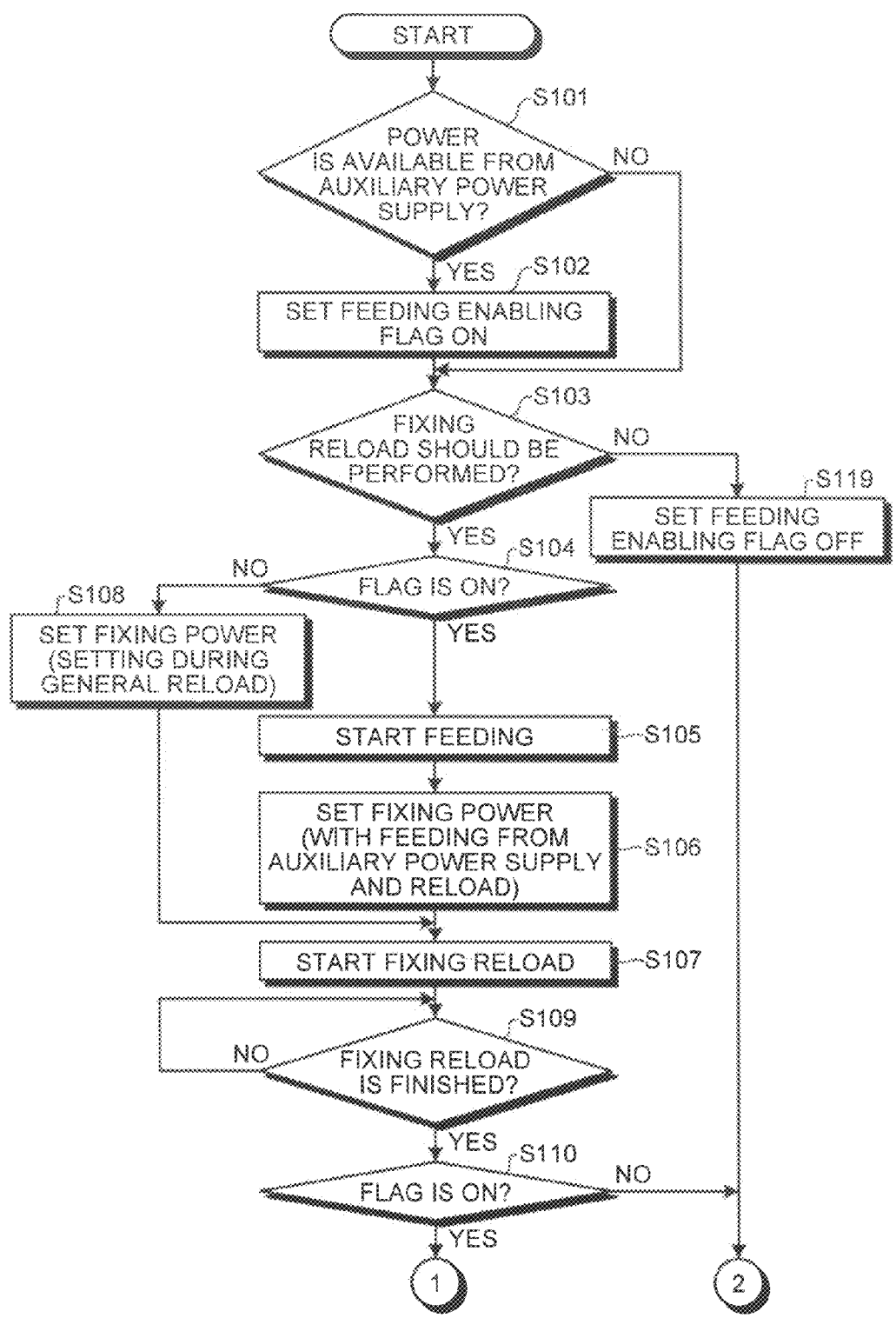
FIG. 6 is a flow chart explaining power feed control.

More specifically, as shown in FIG. 6, after the initialization is completed, the input/output control unit 64 causes the voltage detecting circuit 123 of the auxiliary power supply unit 63 to detect a charging voltage to determine if the amount of charging power stored in the capacitor 122 is at a level that allows feeding (step S101). If the amount is a feeding enabling amount, the input/output control unit 64 sets a feeding enabling flag indicating feasibility of feeding from the auxiliary power supply unit 63 ON (step S102). Then, the input/output control unit 64 determines if the status of the fixing section 33 including detection of temperature of the fixing and heating unit 66 by the temperature detecting unit 67 needs a fixing reload operation that involves feeding from the auxiliary power supply unit 63 (step S103). The fixing reload means rise of the fixing temperature of the fixing and heating unit 66 to a temperature that enables printing.

If it is determined in step S101 that the capacitor 122 of the auxiliary power supply unit 63 is not at the level that allows feeding, the input/output control unit 64 does not set the feeding enabling flag ON, but it determines if fixing reload operation should be performed (step S103).

If it is determined in step S103 that fixing reload operation involving feeding from the auxiliary power supply unit 63 should be performed immediately after the main power switch 61 is turned on, or at the time of return from the energy-saving mode, the input/output control unit 64 determines if the feeding enabling flag is ON, namely if power can be fed from the auxiliary power supply unit 63 (step S104). If the feeding enabling flag is ON, the input/output control unit 64 starts feeding from the auxiliary power supply unit 63 (step S105).

The input/output control unit 64 gives instructions about fixing power to the fixing power supply section 101 to increase maximum power supply to the fixing and heating unit 66 (step S106), and then starts fixing reload operation (step S107).

If it is determined in step S104 that the feeding enabling flag is OFF, the input/output control unit 64 sets fixing power at a value employed during fixing reload (during general reload) normally performed (when power is not fed from the auxiliary power supply unit 63) (step S108), and then starts fixing reload operation (step S107).

After starting fixing reload operation, the input/output control unit 64 receives notification from the fixing power supply section 101, or retrieves a temperature detected by the temperature detecting unit 67 to check a fixing temperature to see if fixing reload is completed (step S109). The input/output control unit 64 continues fixing reload if fixing reload is not completed.

Figure 7:
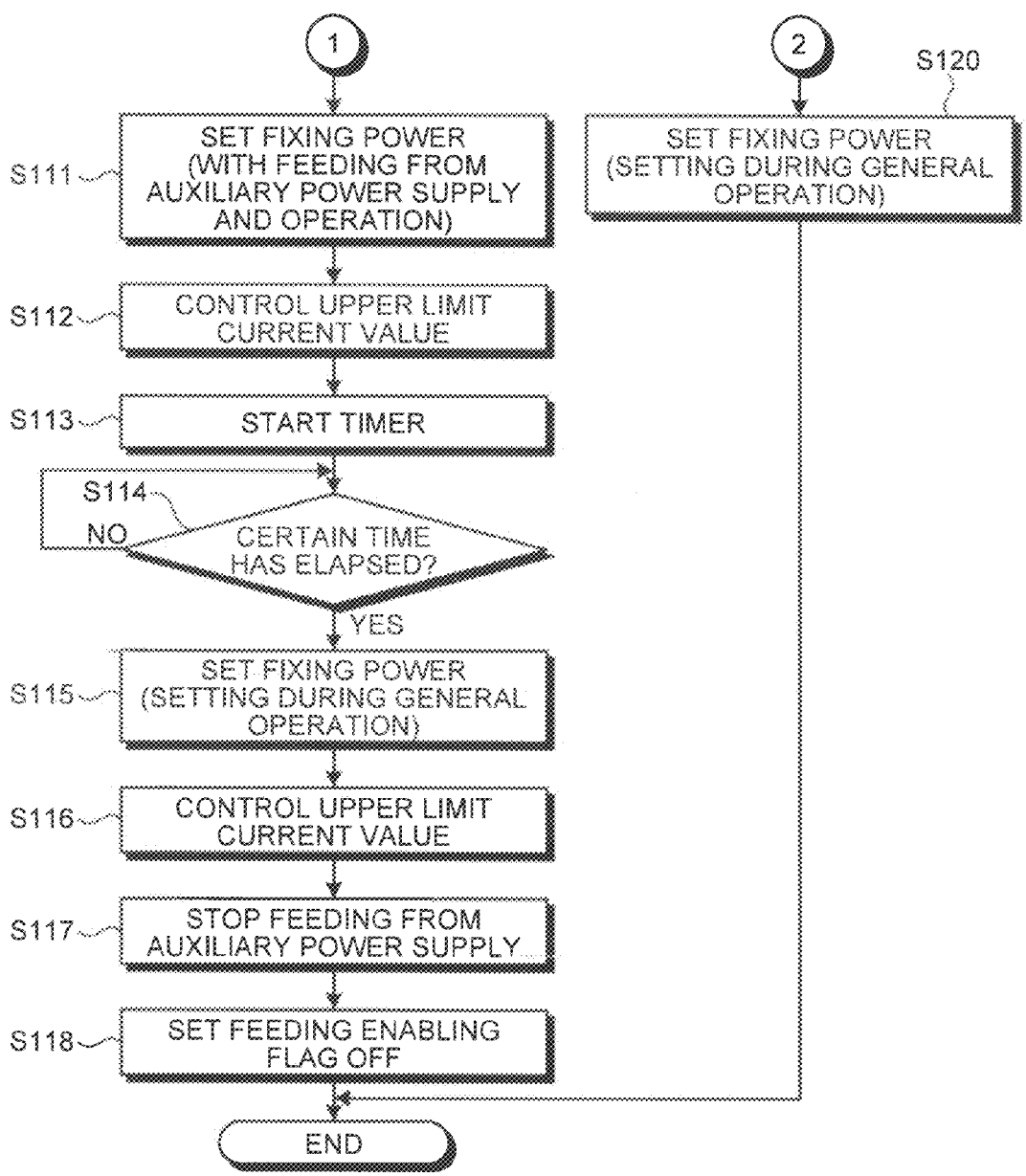
FIG. 7 is a flow chart explaining processing subsequent to the power feed control of FIG. 6.

If it is determined in step S109 that fixing reload is completed, the input/output control unit 64 checks the feeding enabling flag (step S110). If the feeding enabling flag is ON, the input/output control unit 64 outputs a fixing power instruction signal to the fixing power supply section 101 of the main power supply unit 62 (step S111) that instructs change of fixing supply power to printing power (Pb of FIG. 8 described later) that uses auxiliary power supply from the auxiliary power supply unit 63 as shown in FIG. 7. Next, the input/output control unit 64 controls to change the upper limit current set value of the constant-voltage power supply section 102 to an operation set value (Pb of FIG. 8) (step S112).

Figure 10A:
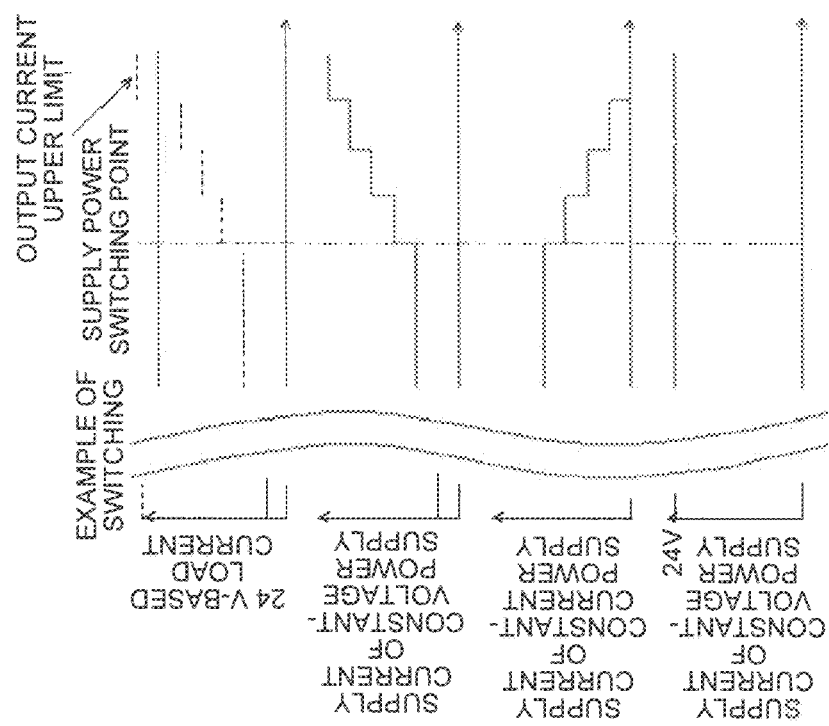
FIGS. 10A and 10B are diagrams showing current changes at the time of switching control of supply power.
Figure 10B:
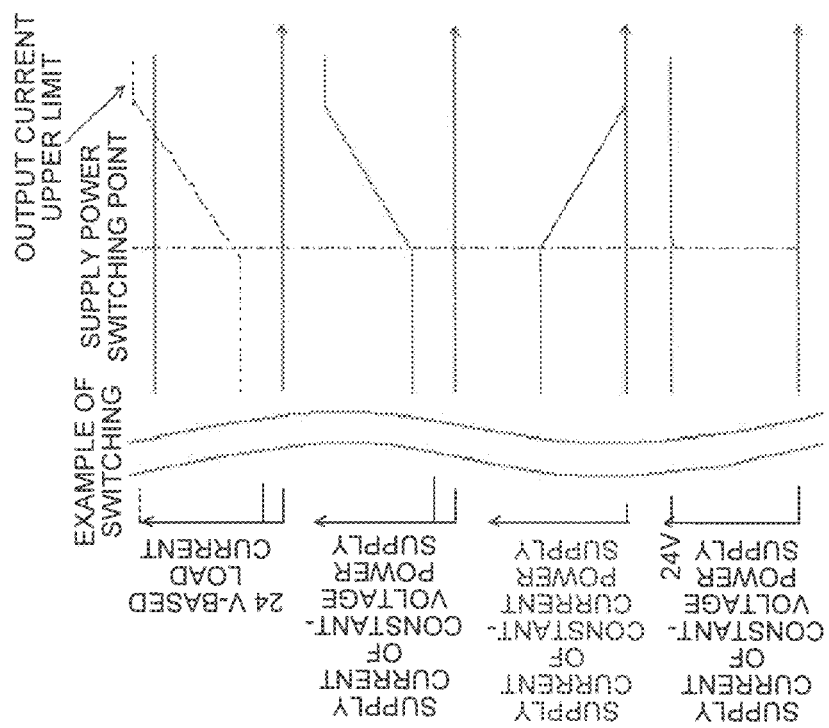

The input/output control unit 64 thereafter starts a timer (step S113), and waits for an elapse of certain time (step S114). After elapse of the certain time, the input/output control unit 64 changes the fixing supply power to general printing power (Pba of FIG. 8) (step S115), and changes the output current upper limit (upper limit current set value) to a greater value (Pba of FIG. 8) (step S116), thereby stopping feeding from the auxiliary power supply unit 63 (step S117). At this time, like in step S112, the input/output control unit 64 increases the output current upper limit (upper limit current set value) that controls the upper limit of the output current of the constant-voltage power supply section 102 stepwise or linearly, for example, to output a resultant value to the current indicator 65 as shown in FIGS. 10A and 10B described later. As a result, the output current of the constant-current power supply section 124 is controlled to converge stepwise or linearly to 0 A in predetermined convergence time.

After feeding from the auxiliary power supply unit 63 stops, the input/output control unit 64 sets the feeding enabling flag OFF again, and completes the control of feeding from the auxiliary power supply unit 63 (step S118).

If it is determined in the aforementioned step S103 of FIG. 6 that the temperature of the fixing and heating unit 66 detected by the temperature detecting unit 67 is the same as or higher than a predetermined temperature, so that fixing reload is unnecessary, or if the feeding enabling flag is OFF in step S102 after fixing reload is completed, the input/output control unit 64 determines that fixing reload is unnecessary. In this case, the input/output control unit 64 sets the feeding enabling flag OFF (step S119), changes the fixing supply power to general printing power, and completes the feeding control (step S120).

As described above, the increase in the amount of power supply to the fixing and heating unit 66 is subtracted from the amount of power fed to the 24 V-based load 69 from the main power supply unit 62 consuming the commercial AC power supply 70, and the subtracted amount is compensated for by feeding the 24 V-based load 69 with power from the auxiliary power supply unit 63. This is the reason why the color digital MFP 1 feeds the 24 V-based load 69 by using the auxiliary power supply unit 63.

Accordingly, the color digital MFP 1 of the present embodiment feeds the 24 V-based load 69 of which power consumption (for example, 500 W) greater than that of the 5 V-based load 68 (for example, 100 W) with power from the auxiliary power supply unit 63 if the amount of power supply to the fixing and heating unit 66 increases, for example, by 300 W.

The load current detector 116 detects a 24 V-based load current value that is a sum of a load current supplied from the rectifying smoothing circuit 113a to the 24 V-based load 69 and a load current supplied from the constant-current power supply section 124 of the auxiliary power supply unit 63 to the 24 V-based load 69, and outputs the detected 24 V-based load current value to the current indicator 65.

An output upper limit current value indicating the output current upper limit of the constant-voltage power supply section 102 is input into the current indicator 65 from the input/output control unit 64. The current indicator 65 outputs, to the constant-current power supply section 124, a current value indication signal (control signal) indicating a value (output current indication value of the constant-current power supply section 124), obtained by subtracting the output upper limit current value input from the input/output control unit 64 from the 24 V-based load current value detected by the load current detector 116 (sum of the current values output from the rectifying smoothing circuit 113a and the constant-current power supply section 124).

The constant-current power supply section 124 feeds a 24 V-based load line (output line of the rectifying smoothing circuit 113a) with the power of the capacitor 122 at a constant current under constant-current control in which a current value indicated by the current value indication signal is set as a target value.

Figure 8:
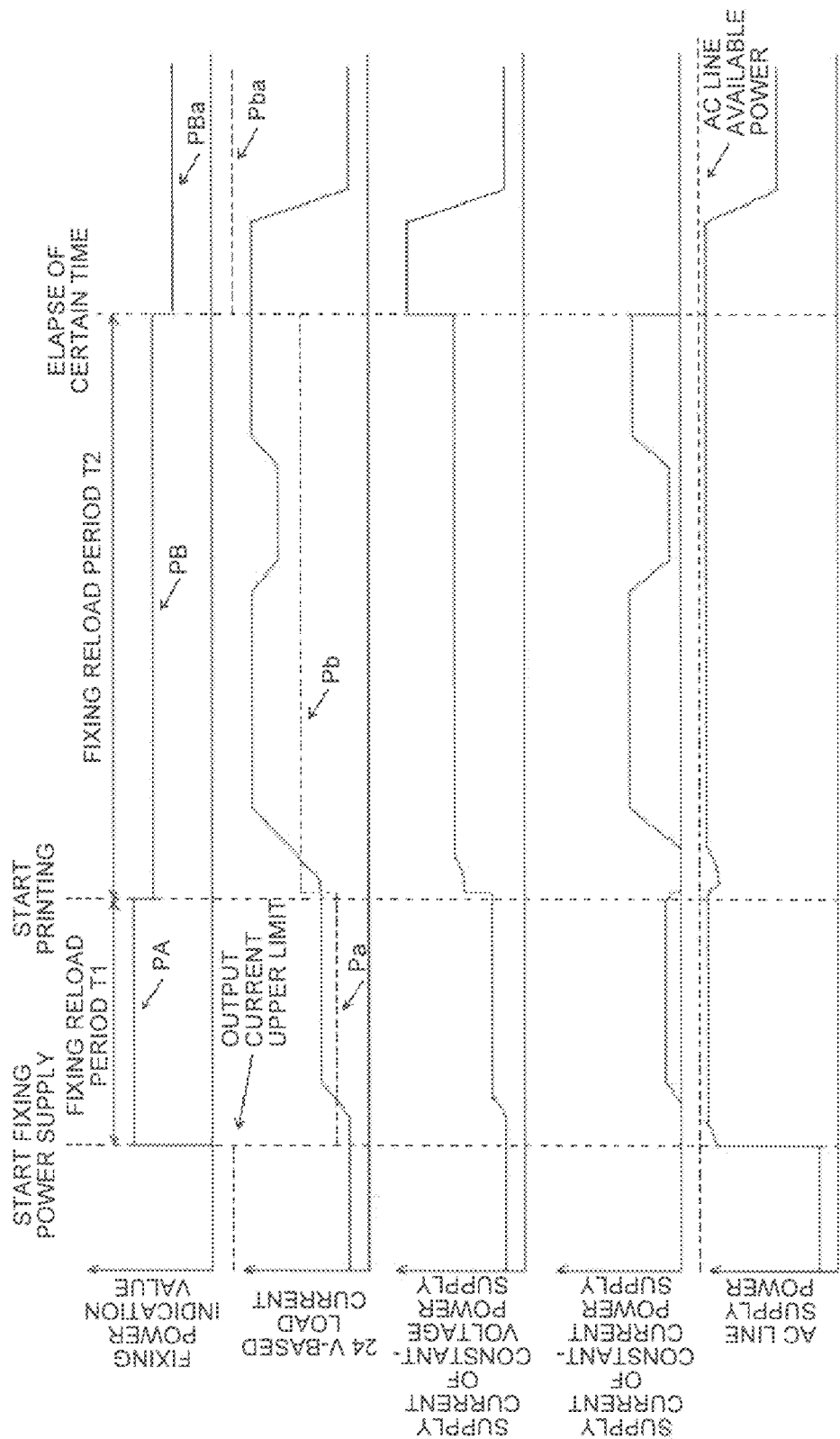
FIG. 8 is a diagram showing transitions of power supply output currents to be applied to an electric load.

FIG. 8 shows transitions in the color digital MFP 1 regarding a fixing power indication value given from the input/output control unit 64 to the fixing power supply section 101, a 24 V-based load current flowing in the 24 V-based load 69, a supply current of the constant-voltage power supply section 102, a supply current of the constant-current power supply section 124, and supply power (supply power on an AC line) of the commercial AC power supply 70 given to the color digital MFP 1. As shown in FIG. 8, in a fixing reload period T1 immediately after the main power switch 61 is turned on and in which a fixing temperature is raised to a target temperature, the fixing and heating unit 66 is supplied with power (for example, 1300 W) considerably greater than power in normal time as indicated by PA of FIG. 8 to satisfy rise time required in the color digital MFP 1. Accordingly, the fixing and heating unit 66 is immediately raised to a temperature that enables printing. At this time, the color digital MFP 1 causes both the constant-voltage power supply section 102 and the constant-current power supply section 124 of the auxiliary power supply unit 63 to supply power to the 24 V-based load 69 to reduce power consumption of the commercial AC power supply 70 by the constant-voltage power supply section 102. This increases allocation of power of the commercial AC power supply 70 to the fixing power supply section 101 to increase power for fixing and heating to be supplied to the fixing and heating unit 66, thereby shortening rise time.

At this time, the input/output control unit 64 makes the output current upper limit to be given to the current indicator 65 be a current indication value that indicates power (Pa of FIG. 8) obtained by subtracting the power allocated to the fixing power supply section 101 and power to be supplied to the 5 V-based load 68 from the power available from the commercial AC power supply 70 (power available on the AC line).

After the temperature of the fixing and heating unit 66 is increased once to a fixing enabling temperature that enables printing, the temperature can be maintained with power supplied from the fixing power supply section 101 that is smaller than that in fixing reload. However, the fixing temperature drops largely due to passage of a sheet at a time T2 when printing is started after fixing reload is finished. Accordingly, power to be supplied to the fixing and heating unit 66 should be increased compared to that in general printing until the temperature is stabilized.

Power consumption by the 24 V-based load 69 may be increased by the activation of a motor and the like during printing. Accordingly, total power including power supply from the fixing power supply section 101 may exceed power available from the commercial AC power supply 70. In response thereto, the color digital MFP 1 sets power distribution to the fixing power supply section 101 during printing to be smaller than that during fixing reload, and greater (PB of FIG. 8, 1200 W) than that during general printing (PBa of FIG. 8, 900 W), and adds a difference from that during fixing reload to power distribution to the constant-voltage power supply section 102, thereby increasing power capable of being supplied to the 24 V-based loads 69 (Pb of FIG. 8).

To be specific, the output current upper limit given from the input/output control unit 64 to the current indicator 65 is set larger than that during fixing reload to make AC power consumption not exceed maximum power available from the commercial AC power supply 70. The output current value of the constant-voltage power supply section 102 falls short of a load current to keep the AC power consumption at a level near an upper limit. Accordingly, the constant-current power supply section 124 of the auxiliary power supply unit 63 feeds the 24 V-based load 69 with a load current corresponding to the shortage.

Meanwhile, the capacitor 122 of the auxiliary power supply unit 63 has a limit in power stored therein, and it cannot supply power continuously. Accordingly, after elapse of certain time to stabilize a fixing temperature, the input/output control unit 64 sets the output current upper limit (upper limit current set value) to be given to the current indicator 65 to a greater value (PBa of FIG. 8) in order to feed the 24 V-based load 69 with power only from the constant-voltage power supply section 102 of the main power supply unit 62, and makes the constant-current power supply section 124 of the auxiliary power supply unit 63 stop feeding the 24 V-based load 69.

At this time, power supply to the fixing and heating unit 66 is changed to the general printing power supply (PBa of FIG. 8).

The period lasting until a fixing temperature is stabilized and ending with stop of power supply from the auxiliary power supply unit 63 is determined as time or the number of sheets to be printed, and may be defined as a fixed value. However, making the value variable by using the size of printing sheets, a room temperature or the like as a parameter makes it possible to set time of power supply from the auxiliary power supply unit 63 in response to time during which a fixing temperature is stable and which changes with an operating mode. As a result, power from the auxiliary power supply unit 63 can be used effectively.

Figure 9:
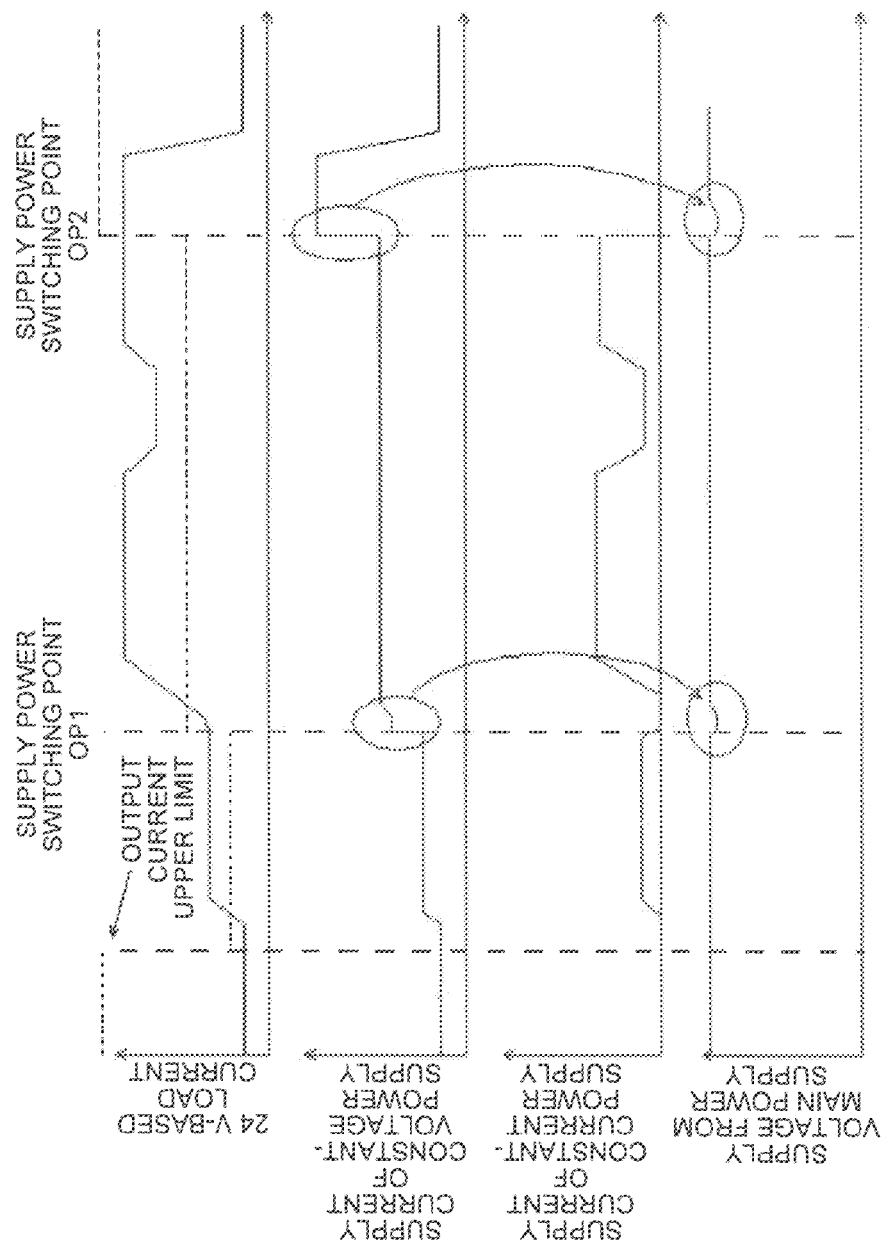
FIG. 9 is a diagram showing an example of how feeding currents change when supply power is switched.

FIG. 9 shows consumption current in the 24 V-based load 69, transitions of states of output currents supplied from the constant-voltage power supply section 102 and the constant-current power supply section 124 to the load, and the output voltage of the constant-voltage power supply section 102 involved. By referring to FIG. 9, if a value of consumption current in the 24 V-based load 69 is 15 A, and the constant-current power supply section 124 supplies 10 A out of 15 A, for example, the constant-voltage power supply section 102 supplies output current of 5 A to the 24 V-based load 69.

If the output current upper limit is changed in this state such that current supply from the constant-current power supply section 124 rapidly becomes 0 A at a supply power switching point CP1 or CP2, the constant-voltage power supply section 102 in turn takes the place of the constant-current power supply section 124 to supply 10 A. Thus, the output current of the constant-voltage power supply section 102 increases rapidly from 5 A to 15 A. This rapid change of the output current of the constant-voltage power supply section 102 makes the output voltage of the constant-voltage power supply section 102 drop to generate voltage fluctuations of a voltage applied to the load, leading to unstable operation of a motor to which power is supplied, stop or nonuniform rotation of the motor, or the like. As a result, an image formed by the color digital MFP 1 becomes an abnormal image suffering from color deviation, for example.

In response thereto, the color digital MFP 1 of the present embodiment controls the output current of the constant-current power supply section 124 at a time when power supply to the electric loads 68 and 69 is changed in a manner shown in FIG. 10A or 10B.

As described above, the input/output control unit 64 controls to change the output current upper limit at a supply power switching point. To be specific, the output current upper limit is changed by control so that the output current of the constant-current power supply section 124 will not become 0 A rapidly but will converge gradually.

As an example as shown in FIG. 10A, the input/output control unit 64 increases the output current upper limit stepwise to be given to the current indicator 65 in order for the output current (supply current from constant-current power supply) of the constant-current power supply section 124 to decrease stepwise. In this case, the input/output control unit 64 may be controlled to increase the output current upper limit at fixed intervals, or at random intervals.

In FIG. 10B, the input/output control unit 64 increases the output current upper limit linearly to be given to the current indicator 65 in order for the output current of the constant-current power supply section 124 to decrease linearly.

A control method of changing the output current upper limit to be given to the current indicator 65 by the input/output control unit 64 is not limited to those shown in FIGS. 10A and 10B. Any appropriate methods are applicable so long as they cause the output current of the constant-current power supply section 124 to converge gradually to 0 A.

As described above, in the color digital MFP 1 of the present embodiment, the constant-voltage power supply section 102 of the main power supply unit 62 generates constant-voltage power from power supplied from the commercial AC power supply 70 as an external power supply, and supplies the generated constant-voltage power to the 5 V-based load 68 and the 24 V-based load 69. The power supplied from the commercial AC power supply 70 is further stored in the capacitor 122 of the auxiliary power supply unit 63, and the constant-current power supply section 124 generates constant-current power from the stored power and supplies the generated power to the 24 V-based load 69. The load current detector 116 detects a load current flowing in the 24 V-based load 69. Based on the condition of the load, the input/output control unit 64 provides the current indicator 65 controlling the output current of the constant-current power supply section 124 with the output current upper limit that limits constant-current power to be supplied from the constant-current power supply section 124 of the auxiliary power supply unit 63 to the 24 V-based load 69. In order to stop or reduce power supply from the constant-current power supply section 124 of the auxiliary power supply unit 63, the input/output control unit 64 controls the output current upper limit such that the supply power from the constant-current power supply section 124 of the auxiliary power supply unit 63 is caused to converge to 0 A in a predetermined convergence time.

Thus, rise time can be shortened at the time of startup by auxiliary power from the auxiliary power supply unit 63, and constant-current power supplied from the auxiliary power supply unit 63 is caused to converge gradually when supply of the constant-current power from the auxiliary power supply unit 63 to the 24 V-based load 69 is stopped or reduced. This prevents rapid change of the output current of the constant-voltage power supply section 102 to be caused by sudden loss of the constant-current power from the auxiliary power supply unit 63. Thus, the output voltage of the constant-voltage power supply section 102 will not drop so that voltage fluctuations of a voltage applied to the load will not occur. As a result, an image formed by the color digital MFP 1 will not become an abnormal image suffering, for example, from color deviation to be caused by unstable operation of a motor to which power is supplied, stop or nonuniform rotation of the motor, or the like.

In the color digital MFP 1 of the present embodiment, the input/output control unit 64 changes the output current upper limit stepwise to cause supply power from the constant-current power supply section 124 of the auxiliary power supply unit 63 to converge to 0 A in a predetermined convergence time.

Accordingly, the power supply from the constant-current power supply section 124 of the auxiliary power supply unit 63 to the 24 V-based load 69 can be caused to converge stepwise and gradually to 0 A with a simple circuit structure. Thus, the output voltage of the constant-voltage power supply section 102 will not drop so that voltage fluctuations of a voltage applied to the load will not occur. As a result, an image formed by the color digital MFP 1 is prevented from becoming an abnormal image at low cost that suffers, for example, from color deviation to be caused by unstable operation of a motor to which power is supplied, stop or nonuniform rotation of the motor, or the like.

In the color digital MFP 1 of the present embodiment, the input/output control unit 64 also linearly changes the output current upper limit to cause the supply power from the constant-current power supply section 124 of the auxiliary power supply unit 63 to converge to 0 A in a predetermined convergence time.

Accordingly, the supply power from the constant-current power supply section 124 of the auxiliary power supply unit 63 to the 24 V-based load 69 can be caused to converge linearly and gradually to 0 A with a simple circuit structure. Thus, the output voltage of the constant-voltage power supply section 102 will not drop so that voltage fluctuations of a voltage applied to the load will not occur. As a result, an image formed by the color digital MFP 1 is prevented from becoming an abnormal image at low cost that suffers, for example, from color deviation to be caused by unstable operation of a motor to which power is supplied, stop or nonuniform rotation of the motor, and the like.

The color digital MFP 1 of the present embodiment uses an electric double-layer capacitor as the capacitor 122 of the auxiliary power supply unit 63.

Accordingly, the auxiliary power supply unit 63 can be formed by storing large-capacity power at low cost, thereby achieving cost reduction.

Also, in the color digital MFP 1 of the present embodiment, the main power supply unit 62 includes the fixing power supply section 101 (power supply unit for fluctuating electric load) that generates fixing power, which is fluctuating power to be supplied to a fluctuating electric load (fixing and heating unit 66) that largely fluctuates in power consumption depending on its operating condition, from power supplied from the commercial AC power supply 70, and supplies the generated fixing power. Further, the input/output control unit 64 controls the output current upper limit to be given to the current indicator 65 while also incorporating the condition of the fixing and heating unit (fluctuating electric load) 66 into the condition of the load.

Accordingly, the temperature of the fixing and heating unit 66 can be raised rapidly to a fixing temperature. Further, when the power supply from the constant-current power supply section 124 of the auxiliary power supply unit 63 is stopped, the supply power to the 24 V-based load 69 can be caused to converge linearly and gradually to 0 A. Thus, the output voltage of the constant-voltage power supply section 102 will not drop so that voltage fluctuations of a voltage applied to the load will not occur. As a result, an image formed by the color digital MFP 1 is prevented from becoming an abnormal image at low cost that suffers, for example, from color deviation to be caused by unstable operation of a motor to which power is supplied, stop or nonuniform rotation of the motor, or the like.

The color digital MFP 1 of the present embodiment uses an electric double-layer capacitor as the capacitor 122 of the auxiliary power supply unit 63.

The present invention causes the output current of the auxiliary power supply unit to converge in predetermined convergence time. Therefore, voltage fluctuations at an electric load can be stabilized, even in a case that the output current from the auxiliary power supply unit is high and the power supply from the auxiliary power supply unit stops.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power supply device, comprising:
   a main power supply unit that generates predetermined power from power supplied from an external source, and supplies the generated predetermined power to an electric load;
   a current detecting unit that detects a load current value of a load current that flows to the electric load;
   a current indicating unit that compares the load current value with a predetermined upper limit current value, and outputs a current value indication signal that indicates a difference current value that corresponds to a surplus of the load current value relative to the upper limit current value;
   an electric storage unit that stores the power supplied from the external source;
   an auxiliary power supply unit that generates constant-current power from the power stored in the electric storage unit, and supplies the generated constant-current power to the electric load, the constant-current power adopting the difference current value indicated by the current value indication signal as a set current value; and
   a control unit that determines the upper limit current value to be output to the current indicating unit on the basis of at least a condition of the electric load, and controls the upper limit current value such that power supplied from the auxiliary power supply unit to the electric load is converged gradually in a predetermined convergence time when the power supply from the auxiliary power supply unit to the electric load is stopped or reduced.

2. The power supply device according to claim 1, wherein the control unit changes the upper limit current value stepwise to cause the power supplied from the auxiliary power supply unit to the electric load to converge gradually in the predetermined convergence time.

3. The power supply device according to claim 1, wherein the control unit changes the upper limit current value linearly to cause the power supplied from the auxiliary power supply unit to the load to converge gradually in the predetermined convergence time.

4. The power supply device according to claim 1, wherein the electric storage unit is an electric double-layer capacitor.

5. The power supply device according to claim 1, further comprising a power supply unit for fluctuating electric load that generates fluctuating power from the power supplied from the external source, and supplies the generated fluctuating power to a fluctuating electric load of which power consumption largely fluctuates depending on an operating condition of the fluctuating electric load,
   wherein the control unit controls the upper limit current value to be output to the current indicating unit on the basis of the operating condition of the fluctuating electric load and the condition of the electric load.

6. An image forming apparatus that forms an image by operating an image forming unit as an electric load with power supply, the apparatus comprising a power supply device, wherein the power supply device includes:
   a main power supply unit that generates predetermined power from power supplied from an external source, and supplies the generated predetermined power to an electric load;
   a current detecting unit that detects a load current value of a load current that flows to the electric load;
   a current indicating unit that compares the load current value with a predetermined upper limit current value, and outputs a current value indication signal that indicates a difference current value that corresponds to a surplus of the load current value relative to the upper limit current value;
   an electric storage unit that stores the power supplied from the external source;
   an auxiliary power supply unit that generates constant-current power from the power stored in the electric storage unit, and supplies the generated constant-current power to the electric load, the constant-current power adopting the difference current value indicated by the current value indication signal as a set current value; and
   a control unit that determines the upper limit current value to be output to the current indicating unit on the basis of at least a condition of the electric load, and controls the upper limit current value such that power supplied from the auxiliary power supply unit to the electric load is converged gradually in a predetermined convergence time when the power supply from the auxiliary power supply unit to the electric load is stopped or reduced.

* * * * *